Aug. 27, 1963

A. G. RICHTER 3,101,939

MULTIPLE HARNESS RACK

Filed May 26, 1960

2 Sheets-Sheet 1

INVENTOR.
ALFRED G. RICHTER

BY George A. Sullivan
Agent

Aug. 27, 1963 | A. G. RICHTER | 3,101,939

MULTIPLE HARNESS RACK

Filed May 26, 1960 | 2 Sheets-Sheet 2

*INVENTOR.*

ALFRED G. RICHTER

*BY* George A. Sullivan

Agent 3,101,939
MULTIPLE HARNESS RACK

Alfred G. Richter, Pacoima, Calif., assignor to Lockheed Aircraft Corporation, Burbank, Calif.

Filed May 26, 1960, Ser. No. 31,927
2 Claims. (Cl. 269—40)

This invention relates to apparatus for fabrication of various harness and cable layouts, and more particularly to an apparatus for prefabrication of harness and cables in three dimensions to facilitate wiring electrical assemblies.

Wiring of electrical assemblies and subassemblies is generally dictated by design factors such as component layout, lead dress, shielding and economics. Interconnections of the various electrical components on a metal chassis in general determines the relative position of each component as is considered well-known to those skilled in the art. In other words, the general practice is to lay out the electrical components and stages in succession on the chassis, in such manner so as to make the best use of the area of the chassis and yet maintain a minimum spacing which is necessitated by heat dissipation through ventilation, servicing and interference of circuit frequencies. While the latter may be avoided by adequate shielding, it is usually the practice to isolate different parts by physically spacing the stages in successive order on the chassis and keeping outputs of succeeding stages physically separated from prior stages.

External connections to the various circuits enter the chassis through a convenient plug or socket, the location of which is determined in the usual manner, i.e., the external connection is usually located on the top or side of the chassis at a point so that internal connections can be made with a minimum of wire length and yet maintain a well-organized and neat harness layout.

A harness of the type under consideration is a multiconductor cable or trunk wherein the conductors are laced or tied with suitable string or the like and having branch conductors leaving the main trunk at predetermined "break outs," and finally terminating in subbranches where the conductors are terminated at the point where the electrical connection to the proper component is made.

It is apparent that each conductor could be run from the external plug or socket to the designated point in the electrical circuit utilizing the shortest conductor feasible. But this of course would create an undesirable disorderly array of wiring with unpredictable sources of inter-action of circuits. Conventionally, the conductors are bundled together and tied at intervals along the bundle. Once the placing of the bundle has been determined any interaction of circuits can be eliminated and thereafter forgotten utilizing the predetermined layout of the harness or cable-run.

Normally once a layout for a particular harness design has been determined a board or frame is designed for that configuration and the harness is assembled on that particular board. In the event of a design change a new board must be made up and the old board discarded. Thus, each and every harness configuration requires a separate board. When a number of harnesses are assembled at a time, one can readily see the expense of constantly replacing the harness boards for each new deign.

Furthermore, many of the harness configurations take on a three dimensional aspect which with conventional methods becomes quite complex, inherently require considerable expenditure of time and effort in laying out and designing a three dimensional harness on a two dimensional board.

It is readily seen that a great need is present for means for rapid assembly of electrical harnesses both in two and three dimensions. The device should be adjustable so that it could be readily set up for any harness configuration and over-all size.

Accordingly, it is an object of this invention to provide a multiple harness rack which eliminated one or more of the above disadvantages.

A second object of the invention is to provide a harness rack for fabrication of various harness and cable layouts in either two or three dimensions and utilizing a single harness or cable board or rack.

Another object of the invention is to provide a harness rack which is adjustable in two or three dimensions, and fully adjustable in any of the three dimensions to permit fabrication of various harness layouts, eliminating the need for separate racks.

These and further objects will be readily apparent to those skilled in the art from the following specification and drawings, wherein a preferred embodiment is illustrated.

Reference is now made to the acompanying drawings in which.

Figure 1:
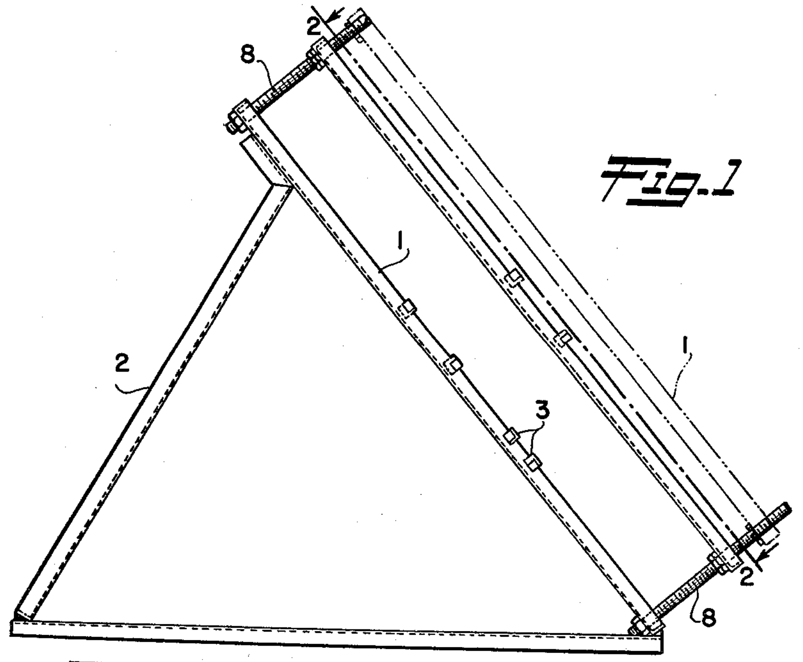
FIGURE 1 is a side view in elevation of the preferred form of the invention.
Figure 2:
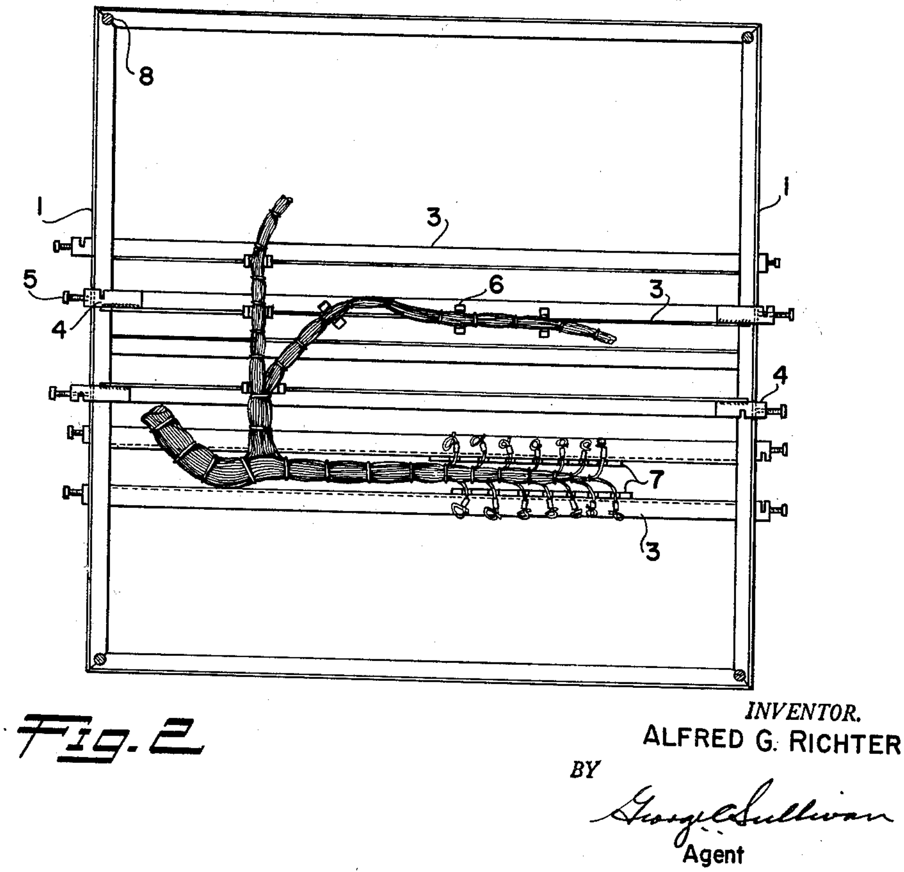
FIGURE 2 is an oblique view of the frame or rack of FIGURE 1 taken on line 2—2.

With reference to FIGURES 1 and 2, a frame 1 of angular material having four sides of equal dimension is supported at a suitable angular relation from the horizontal by a stand 2. While a tilt angle of about 40° has been found to be very satisfactory, it is apparent that the inclination could be more or less than that illustrated, as desired.

At each corner of the inclined frame, a threaded rod is attached by suitable means such as the double nut arrangement as shown. A second frame may thus be stacked above the first frame by suitable spacing nuts, which provide for variable spacing of the frames. Of course if the harness configuration requires it, additional frames may be stacked on the threaded rods in the manner described.

Cross pieces 3, likewise of angular material, are adjustably attached to the sides of the frame. The cross pieces are provided with attaching means at either end (see FIGURE 6) which permits attachment to the frame so that the angle material may be in either of the positions shown. The attaching means illustrated comprises a solid piece of material 4 having a pair of slots at right angle to each other, which is welded to the ends of the angular cross piece. A set screw 5 is provided in either end. The spacing between the respective slots is determined by the dimension of the frame, thereby permitting either of the positions shown in FIGURES 1 and 2. It will be understood that with a square frame as shown the angular cross pieces may be attached to the frame perpendicular to the position shown.

Figures 3, 4, 5, 6:
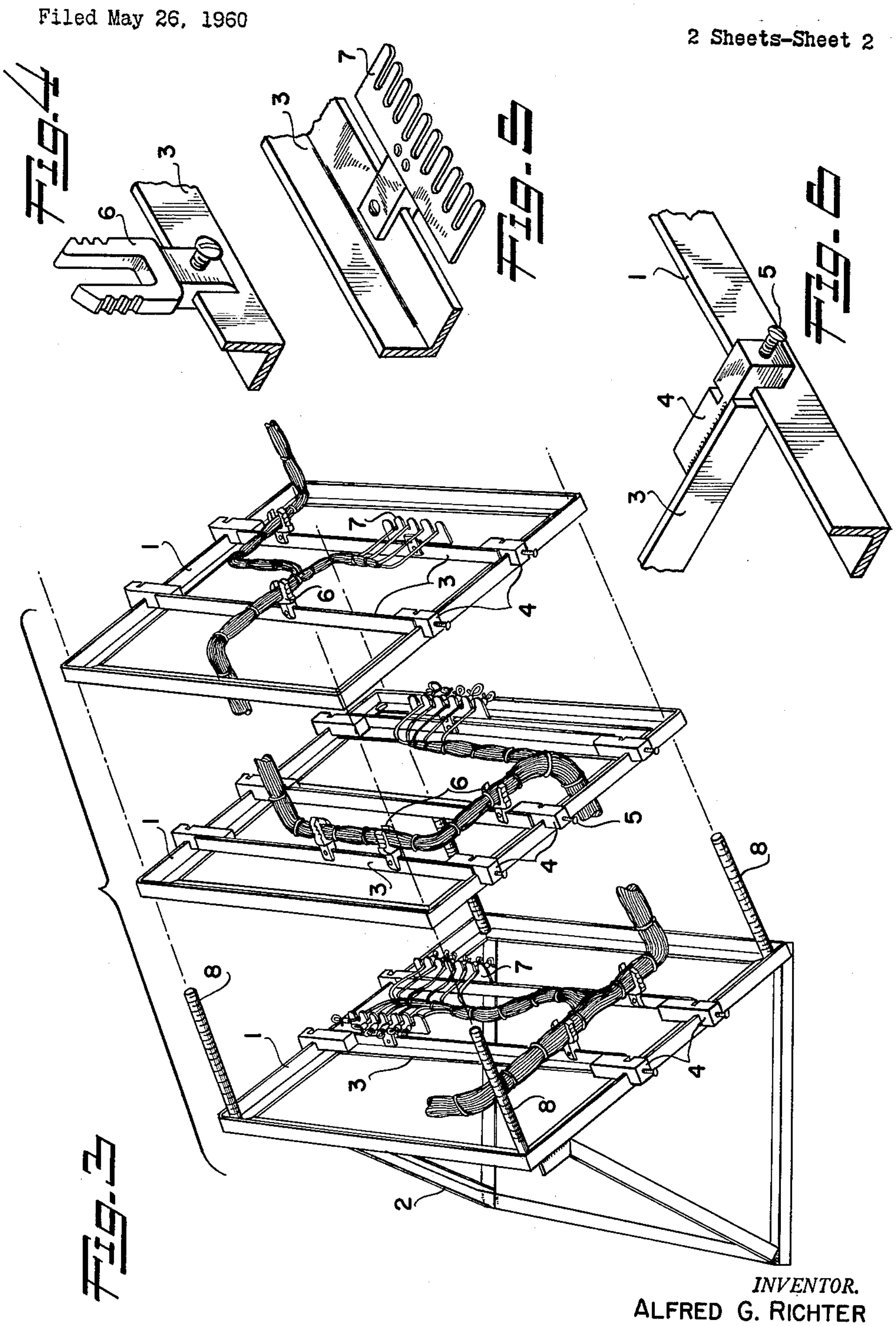
FIGURE 3 is a perspective view of the invention with a harness in place and in the process of fabrication.
FIGURES 4, 5 and 6 are illustrative of certain details of FIGURES 1 to 3.

Attached to each cross piece are suitable U clips 6, combs 7 or other fixtures to facilitate in fabrication of the harness. Each of these fixtures is provided with a bracket and set screw, for positioning along the cross pieces as required by the predetermined harness configuration. A typical clip 6 is illustrated in FIGURE 4 and a typical comb 7 is seen in FIGURE 5. It is of course apparent that the clips 6 may be provided in different sizes to fit different size bundles of conductors as the fabrication progresses.

As should be apparent from the above description, a pattern or configuration of the harness to be fabricated is predetermined from a prototype of the particular electrical assembly. Once this prototype harness configuration has been determined, the present invention greatly expedites the final fabrication for production assemblies and one is able to fabricate numerous configurations on the invention by making a few rapid adjustments which eliminate expensive manufacture of individual harness boards.

Referring to FIGURE 3, a typical harness configuration is shown as completed and tied. While a stacked frame and a simple harness configuration is illustrated for clarity purposes only, it should be understood that very complicated configurations are possible by adding several cross pieces and retaining clips to both frames.

Fabrication may be facilitated by planned documents which are made up from a model or prototype. If the sides of the frame and cross pieces are marked off with appropriate zone markings more or less in a grid fashion then it is readily seen that the total configuration may be reduced to documentary form. For example, if the left and right sides of the frame may be divided into a plurality of zones, say fifteen (15) and marked with numbers, whereas the top, bottom and cross pieces may be divided into equal zones and marked with letters of the alphabet; thus any point in the rectangle (or square) may be designated by a number and letter coordinates, e.g., 5–A may designate the position of the first clip-retainer on the lower rack. The positioning of the cross pieces also may be indicated by two like numbers (5—5) for one direction on the frame or by two letters (C—C) for the other direction.

Directions to the operator will therefore conveniently take the form of a planned document having corresponding coordinates, and the position of cross-members and harness clips being indicated by appropriate symbols. The harness may be schematically illustrated as a simple line diagram which will schematically indicate to the operator the location of branch trunks and the conductors (by code) in that branch and the final breakouts for which the comb-like holders are used.

Once the crosspieces are adjusted to position and the U clips and combs are in place, the operator may quickly fix one end of the main trunk in place and then following the diagram, separate designated conductors from the trunk and lay these in the U clips as called for diagrammatically until the break is reached. At this point the individual conductors may be separated and placed in various slots of the comb. The ends of the conductors may be cut-off a predetermined distance, usually 1¼″ to 2″, from the holder, for soldering to appropriate terminals of the assembly when installed. The remainder of the conductors are likewise laid out in a similar manner. Once the final configuration is completed, the harness is tied in conventional manner and removed from the frame(*s*).

It is therefore believed apparent that the present invention provides a single apparatus which is readily adaptable for the fabrication of various harness configurations from relatively simple to very complex harnesses. The expense of making up a separate harness board for each new configuration is thereby eliminated along with the accompanying problem of storage of numerous racks or boards. Merely changing the harness fabrication diagram to a coordinate plan or equivalent instructions makes possible the use of this invention for an infinite number of configurations.

While a specific embodiment of the invention has been shown and described it should be understood that certain alterations, modifications and substitutions may be made to the instant disclosure without departing from the spirit and scope of the invention as defined by the appended claims.

I claim:

1. An apparatus for fabrication of electrical harness comprising a plurality of quadrilateral frames arranged one above the other, means for adjusting the spacing between said frames, cross members mounted on each frame and attached to opposite sides of said frame, means for adjusting the position of said members relative to said frame and to each other, harness retaining means adjustably positioned along each of said cross members for resiliently holding the main trunk and branches of said harness during the fabrication of said harness, whereby harnesses of various configurations may be readily fabricated on said frames.

2. A multiple harness rack comprising a plurality of quadrilateral frames arranged one above the other, a rigid stand for holding said frames in an angular relation to the horizontal, means for adjusting the spacing between said frames, cross-members mounted in adjustable relation on opposite sides of said frame for movement along said sides, means for retaining said cross-members in the adjuted positions, harness holding means positioned along each of said cross-members for resiliently holding the main trunk and branches of said harness during fabrication of said harness, means for adjusting the position of said holding means, whereby electrical harnesses of various configurations may be readily fabricated on said frames.

References Cited in the file of this patent

UNITED STATES PATENTS

| | | |
|---|---|---|
| 1,393,125 | Henon | Oct. 11, 1921 |
| 1,648,409 | Kuney | Nov. 8, 1927 |
| 1,760,538 | Becker | May 27, 1930 |
| 1,837,962 | Hensgen | Dec. 22, 1931 |
| 2,066,876 | Carpenter et al. | July 5, 1937 |
| 2,264,408 | Rohr et al. | Dec. 2, 1941 |
| 2,310,774 | Garbe et al. | Feb. 9, 1943 |
| 2,768,428 | MacGregor et al. | Oct. 30, 1956 |
| 2,774,134 | Smith et al. | Dec. 18, 1956 |
| 2,805,471 | Lowden | Sept. 10, 1957 |